United States Patent [19]

Knoll

[11] Patent Number: 5,442,448
[45] Date of Patent: Aug. 15, 1995

[54] DEVICE FOR THE LATERALLY RESOLVED INVESTIGATION OF A LATERALLY HETEROGENEOUS ULTRATHIN OBJECT LAYER

[75] Inventor: Wolfgang Knoll, Mainz, Germany

[73] Assignee: Boehringer Mannheim GmbH, Mannheim, Germany

[21] Appl. No.: 215,022

[22] Filed: Mar. 21, 1994

[30] Foreign Application Priority Data

Mar. 27, 1993 [DE] Germany .............. 43 10 025.2

[51] Int. Cl.⁶ .................. G01B 11/06; G01N 21/84
[52] U.S. Cl. .................................. 356/445
[58] Field of Search ........................ 356/445

[56] References Cited

U.S. PATENT DOCUMENTS 4,889,427  12/1989  Van Veen et al. ............ 356/445
4,915,482  4/1990   Collins et al. ............... 350/355

FOREIGN PATENT DOCUMENTS 0226604  5/1986   European Pat. Off. .
0455067  11/1991  European Pat. Off. .
0469377  2/1992   European Pat. Off. .
3720387  11/1988  Germany .

OTHER PUBLICATIONS

Rothenhäusler et al "Surface–plasmon microscopy" *Nature*, No. 6165, vol. 332, 14 Apr. 1988, pp. 615–617.
Pockrand et al, "Surface plasma oscillations at sinusoidal silver surfaces" *Applied Optics*, vol. 16, No. 7, Jul. 1977, pp. 1784–1786.
Teng, "Plasma Radiation From Metal Grating Surfaces", *Physical Review Letters*, vol. 19, No. 9, Aug. 28, 1967, pp. 511–514.
Hickel et al, *J. Appl. Phys.*, "Surface plasmon microscopic characterization of external surfaces", vol. 66, (10), Nov. 15, 19879, pp. 4832–4836.
Hickel et al, *J. Appl. Phys.*, "Surface plasmon optical characterization of lipid monolayers at 5 μm lateral resolution", vol. 67, (8), Apr. 15, 1990, pp. 3572–3757.
Knoll, *Materials Research Society MRS Bulletin*, "Optical Characterization of Organic Thin Films and Interfaces with Evanescent Waves", vol. 16, No. 7, Jul. 1991, pp. 29–39.
Inagaki et al, *The American Physical Society*, "Photoacoustic study of plasmon resonance absorption in a diffraction grating", (1983).
Bryan-Brown et al, *Journal of Modern Optics*, "Polarisation conversion through the excitation of surface plasmons on a metallic grating", 1990, vol. 37, No. 7, pp. 1227–1232.

*Primary Examiner*—Richard A. Rosenberger
*Attorney, Agent, or Firm*—Nikaido, Marmelstein, Murray & Oram

[57] ABSTRACT

A device for the laterally resolved investigation of a laterally heterogeneous ultrathin object layer, especially for the laterally resolved detection of a change in the layer thickness of the object layer which results from a specific binding reaction of a first binding partner bound to the object layer with an unbound second binding partner. The device has a multilayer structure which extends in an investigation region and includes the object layer as first layer and a second layer adjacent to the latter, a coupler arrangement for the coupling in of excitation light into the second layer. The excitation light generates at at least one defined angle of incidence in the second layer a bound, non-radiating electromagnetic wave, from which an evanescent wave extends into the object layer. An optical imaging system is provided for the imaging of the investigation region of the object layer in an image plane at a defined angle of emergence, at which detection light is coupled out from the second layer. The coupler arrangement includes an optical grating structure which extends in the investigation region parallel to the object layer and which is rotatable about an axis extending perpendicular to the grating plane. This allows adjustment of the image contrast, by varying the orientation of the grating lines relative to the plane of incidence.

10 Claims, 5 Drawing Sheets

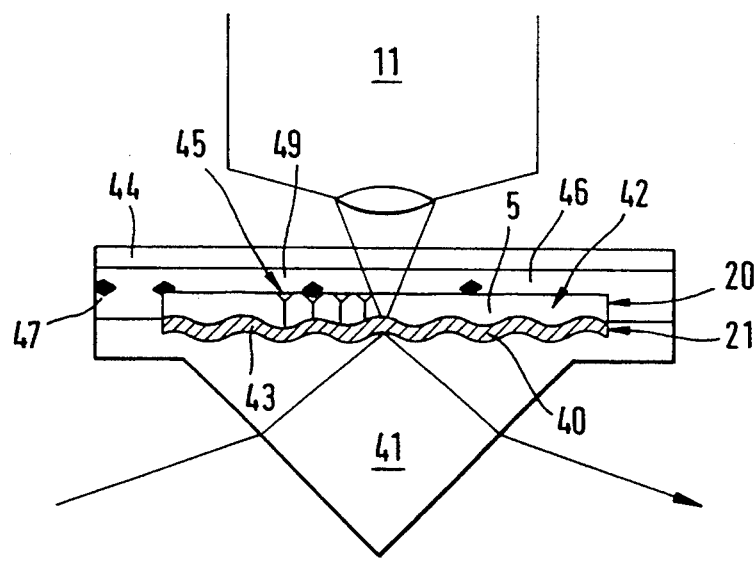
Fig. 10
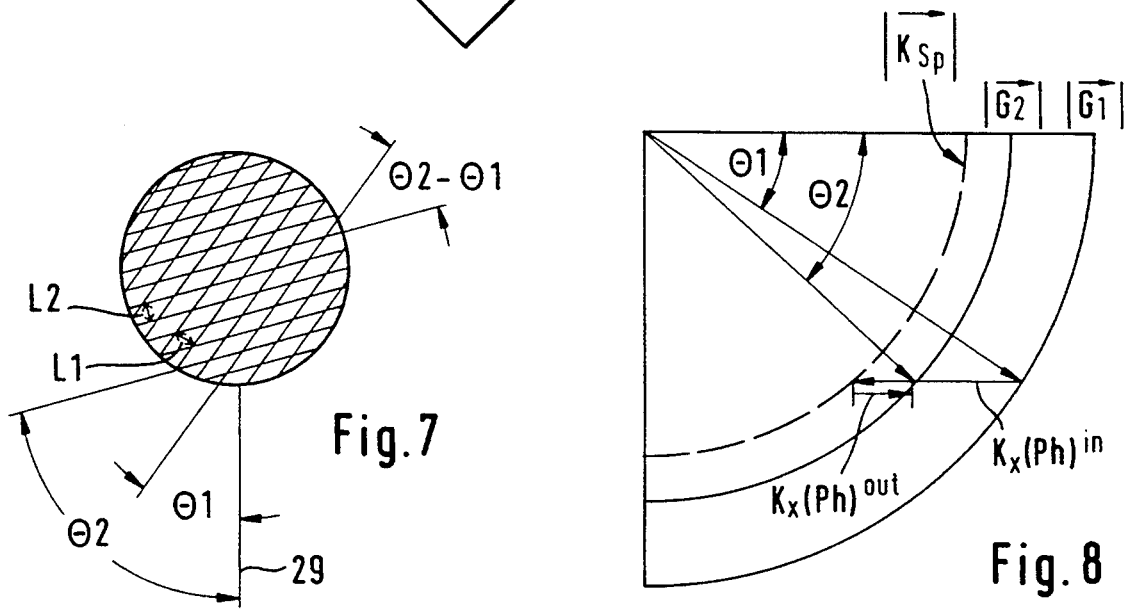
Fig. 7
Fig. 8
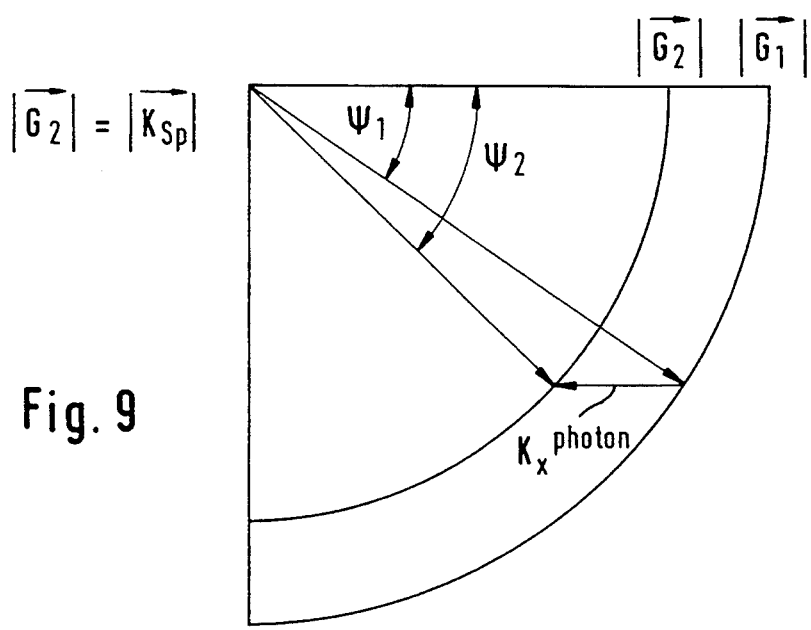
Fig. 9

DEVICE FOR THE LATERALLY RESOLVED INVESTIGATION OF A LATERALLY HETEROGENEOUS ULTRATHIN OBJECT LAYER

The invention relates to a device for the laterally resolved (differentiated) investigation of a laterally heterogeneous ultrathin object layer, especially of a change—differing in differing partial regions—in the layer thickness of the object layer which results from a specific binding reaction of a first binding partner bonded to the object layer with an unbound second binding partner.

For numerous practical applications, it is necessary to investigate ultrathin layers in a laterally resolved manner. Such laterally heterogeneous structures may have a layer thickness in the order of one nanometer ($10^{-6}$ mm) and should be probed in such a manner that very small differences, especially variations of the layer thickness, which in many cases amount to only fractions of a nanometer, are recognizable. This is also designated hereinbelow as "microscopy of ultrathin layers".

This is not possible using normal progagatory electromagnetic waves. Not only with visible light, but also with electromagnetic waves of shorter wavelengths, as used in electron microscopy, it is impossible to achieve a contrast between partial regions of differing thickness which permits a laterally differentiated investigation of such layers.

For such investigations, in which the layer consists in many cases only of one or a few molecular layers, methods were developed in which the "illumination" of the specimen is based on evanescent waves. Evanescent waves are best known from the total reflection of light which takes place when a light beam is directed in a medium having a higher refractive index (for example glass), at an angle which is smaller than the critical angle, against a boundary surface with a medium of smaller refractive index (for example air). Closer investigation of this phenomenon shows that the electric field in the medium of smaller refractive index (i.e., for example, air) does not fall off to zero abruptly, but that, instead, a harmonic wave propagating parallel to the boundary surface can be observed, the amplitude of which falls off exponentially perpendicular to the boundary surface.

In order to apply this phenomenon to the laterally resolved investigation of heterogeneous object layers, essentially the following elements are required.

A layer structure is provided on a carrier part (substrate) having a plane surface. The layer structure comprises not only the object layer but also at least one second layer which is designed such that a bound non-radiating electromagnetic wave can be generated. Accordingly, the second layer is designated hereinbelow as a "wave-forming layer". In particular the following two structures are known.

On the one hand, the second layer can be a thin planar waveguide layer. A thin layer of an optically transparent material having a high refractive index is suitable. The refractive index must be higher than that of the neighbouring layers adjoining on both sides. Details can be obtained, for example, from European Patent Specification 0 226 604, which however, exclusively refers to a method of investigation in which no lateral differences can be detected. Further details concerning the pertinent differences in comparison with the present invention are given hereinbelow.

In the second known process for the generation of evanescent waves in the object layer, the second layer, which is adjacent to the latter, is composed of metal, in which layer a surface plasmon (PSP=plasmon surface polariton) is excited. The laterally differentiated investigation of object layers by means of surface plasmon microscopy (SPM) is described, inter alia, in the following publications:

German Patent Application 37 20 387

B. Rothenhäusler, W. Knoll: "Surface-plasmon microscopy", Nature, Vol. 332, No. 6165, pp. 615–617 (1988)

W. Hickel, B. Rothenhäusler, W. Knoll: "Surface plasmon microscopic characterization of external surfaces", J. Appl. Phys. 66 (1989), pp. 4832–4836

W. Hickel, W. Knoll: "Surface plasmon optical characterization of lipid monolayers at 5 $\mu$m lateral resolution", J. Appl. Phys. 67 (1990), 3572ff.

European Patent Application 0 469 377

In order to generate in the second layer a bound, non-radiating electromagnetic wave, the "evanescent tails" of which extend into the object layer, a light coupler arrangement is required, by means of which light of an excitation lightbeam is coupled in. To this end, prism arrangements and optical gratings have been described in theory but in practice only prisms have been used for the microscopy of ultrathin layers. Both in the case of the surface plasmons and also in the case of the waveguide, the bound non-radiating electromagnetic wave (the plasmon or respectively the waveguide mode) is generated only when the excitation light is incident at a (or one of a plurality of possible) defined angle(s) of incidence, which angle is designated hereinbelow as the "excitation angle". While a lightbeam incident at an excitation angle excites a bound wave and is therefore absorbed to a large extent, lightbeams incident at other angles are reflected. Thus, when the angle of incidence of the excitation light is varied, the reflected light passes through a sharp minimum at an angle at which a bound non-radiating electromagnetic wave is generated.

The excitation angle is (with otherwise unchanged measuring arrangement) dependent upon the object layer. If the thickness and/or composition of the object layer is different in different partial regions, then this results in a local variation of the dispersion relation (i.e. of the interrelationship between momentum and energy) of the bound wave in the second layer. In consequence of this, the absorption of the excitation light is different at two different positions of the object layer.

In order to make this difference visible as an optical contrast, an optical imaging system is necessary, by means of which the investigation region is imaged in an image plane. Expressed in mathematical terms, the imaging system makes a Fourier-back-transformation from the momentum space into real space. The optical imaging system usually is aligned at the angle of incidence, since the light specularly reflected from that area of the object layer which is to be investigated ("investigation region") is to be recorded.

Further details concerning previously known methods for the laterally resolved investigation of a laterally heterogeneous ultrathin object layer can be inferred from the pertinent publications. In particular, reference is made to "Optical Characterization of Organic Thin Films and Interfaces with Evanescent Waves" published in MRS Bulletin, 16, 29–39 (1991).

As was stated in the introduction, the invention is particularly directed to applications in which changes in the layer thickness of the object layer are to be observed and/or quantitatively measured, which changes result from a specific binding reaction of two bioaffined binding partners. Such binding reactions are of significance especially in analytical investigations of sample liquids (in particular in the medical sector, such as, for example, blood and urine).

Analytical processes which are based on the specific binding reaction of two bioaffined binding partners have gained increasing importance. Specific binding reactions in this sense are in particular immunological interactions, i.e. interactions between antigens or haptenes on the one hand and antibodies on the other hand. However, it is also possible to use other specific bioaffined interactions for analytical applications, such as the lectin-sugar interaction, an active substance-receptor interaction and the specific binding between biotin and streptavidin. In the text which follows, for the sake of simplicity, but without restriction upon generality, reference is made to immunological binding reactions.

In immunological analytical methods, use is made in many cases of so-called solid-phase binding reactions, in which a first binding partner is fixed to a solid surface ("solid phase bound") and specifically binds with a second binding partner which is freely mobile ("free") in a liquid which is in contact with the surface. Numerous different reaction sequences are known which all lead to the result that after completion of the analysis reaction the concentration of the second binding partner, which has bound to the first binding partner and is therefore itself bound to the surface, is a measure of the concentration of the analyte in the specimen liquid.

The detection of the binding of the free binding partner to the solid-phase-bound binding partner is usually made possible by labeling the free binding partner (or a further binding partner bound thereto) with a label molecule. Labeling with an enzyme or with a fluorescent molecule is in particular customary. The indirect observation of the binding reaction by means of a label permits analyses with high specificity and sensitivity, but has considerable disadvantages. In particular, in many cases it is difficult to form a "conjugate" of the binding partner and a label. The detection of a fluorescence label requires considerable expenditure on equipment. The detection of an enzyme requires a special reaction step which results in the analysis time being prolonged and the course of the reaction becoming more complicated.

These problems are avoided if it is made possible to observe directly or (for a quantitative analysis) even to measure quantitatively the change in the layer thickness which results from the binding reaction. Such processes are described in the abovementioned European Patent Specification 0 226 604, in an arrangement which operates without lateral resolution.

An analytical system which is based on the laterally differentiated investigation of changes of the layer thickness of an object layer which result from a specific binding reaction is the subject of European Patent Application 0 469 377 the disclosure of which is incorporated herein by reference.

With the aid of evanescent waves, it is possible to investigate ultrathin layers with extremely high sensitivity. By way of example, in the above mentioned European Patent Specification an irregular structure of partial regions of differing binding activity of an object layer is quantitatively determined with a lateral resolution of approximately 5 $\mu m$. The increase of the layer thickness which is associated with the binding reaction amounts, in an example, to 1.8 nm in the partial regions of lower binding activity and to 3.4 nm in those partial regions of the object layer which have greater binding activity. These small changes in the layer thickness are evaluated with such good precision that the concentration of the binding partner bound to the solid phase can be determined with an accuracy sufficient for a quantitative analysis.

For the practical application of this technique, it is of great importance that the expenditure on equipment be kept within justifiable limits. The object of the present invention is accordingly to make a contribution to the simplification of the laterally resolved investigation of ultrathin object layers and to improve the possibilities for the carrying out such methods.

According to a first main aspect of the invention, this object is achieved by a device for the laterally resolved investigation of a laterally heterogeneous ultrathin object layer, especially for the laterally resolved detection of a change in the layer thickness of the object layer which results from a specific binding reaction of a first binding partner bound to the object layer with a free (unbound) second binding partner, having a multilayer structure which extends in an investigation region on a plane surface of a substrate parallel to the plane surface and which comprises the object layer as first layer and a second layer adjacent to the latter, a light coupler arrangement for the coupling in of excitation light, incident in a plane of incidence, into the second layer, in which the excitation light generates at at least one defined angle of incidence in the second layer a bound, non-radiating electromagnetic wave, from which an evanescent wave extends into the object layer and an optical imaging system for the imaging of the investigation region of the object layer in an image plane at a defined angle of emergence, at which detection light is coupled out from the second layer, in which the light coupler arrangement comprises an optical grating structure which extends in the investigation region parallel to the object layer and which is rotatable about an axis extending perpendicular to the grating plane, in order, for the setting of the image contrast, to vary the orientation of the grating lines relative to the plane of incidence by changing the azimuth angle between the plane of incidence and the grating lines.

The rotation of the grating permits the adjustment, in a simple manner, of the contrast of the image of the object layer, in order to achieve optimal contrast values depending upon the respective conditions (especially depending upon the layer thickness of the object layer at a given wavelength of the excitation light and with a given measuring arrangement). This is necessary in order to permit a good imaging and the best possible accuracy of the quantitative determination of the layer thickness in different partial regions of a laterally heterogeneous object layer.

In the previously known methods for the microscopy of ultrathin layers, the contrast was adjusted by variation of the angle of incidence $\phi$ (phi) between the excitation lightbeam and the vertical to the plane of the object layer. In the invention (possibly additionally to the $\phi$ variation, but preferably exclusively) the azimuth angle $\Theta$ (theta) between the grating lines and the plane of incidence of the excitation light is varied. In the text which follows, this is also designated as "microscopy in Θ contrast".

The known microscopy in φ contrast requires a costly mechanical movement system, since simultaneously the angle between the excitation lightbeam and the object surface must be varied by φ and (to maintain the mirror condition) the angle between the excitation lightbeam and the optical axis of the imaging system must be varied by 2φ. Consequently, a synchronous movement of the substrate with the wave-binding structure and of the imaging system (or of the substrate and of the excitation light source) is required. In the invention, this complicated design is replaced by a simple rotation of the substrate with the grating.

Additionally the setting range of the contrast is expanded by the Θ rotation. Consequently the possibilities for optimizing the contrast of the optical image are substantially improved. This is of particular importance in connection with specific binding reactions, for example, where a multistage binding reaction is to be investigated by means of the microscopy of ultrathin layers.

According to a second main aspect, which is preferably combined with the first main aspect, but also has independent significance, the invention is directed to a device for the laterally resolved investigation of a laterally heterogeneous ultrathin object layer, especially for the laterally resolved detection of a change in the layer thickness of the object layer which results from a specific binding reaction of a first binding partner bonded to the object layer with an unbound second binding partner, having a multilayer structure which extends in an investigation region on a plane surface of a substrate parallel to the plane surface and which comprises the object layer as first layer and a second layer adjacent to the latter, a light coupler arrangement for the coupling in of excitation light, incident in a plane of incidence, into the second layer, in which the excitation light generates at at least one defined angle of incidence in the second layer a bound, non-radiating electromagnetic wave, from which an evanescent wave extends into the object layer and an optical imaging system for the imaging of the investigation region of the object layer in an image plane at a defined angle of emergence, at which detection light is coupled out from the second layer, in which for the coupling out of the detection light a coupling out grating is provided, which extends in the investigation region parallel to the object layer, and the magnitude of the grating vector of the coupling out grating is substantially the same as the magnitude of the wave vector of the bound non-radiating electromagnetic wave, so that the detection light is coupled out substantially perpendicular to the grating plane.

These measures allow to observe the investigation region of the object layer, as in normal optical microscopy, in vertical plan view onto the surface. As a result of this, the measurement technique is simplified and at the same time the conditions of the optical imaging of the investigation region are improved. In particular the optical lens used for the imaging of the object layer can be positioned very closely to the surface, whereby the maximum possible numerical aperture is substantially increased. This results in an improved spatial resolution.

The invention is explained in greater detail hereinbelow with reference to embodiments which are diagrammatically shown in the figures. In the figures:

FIG. 7 shows a plan view of a multidiffractive grating structure;

FIG. 8 shows a diagram to explain the function of a multidiffractive grating structure according to FIG. 7;

FIG. 9 shows a diagram to explain the second main aspect of the invention;

FIG. 10 shows an embodiment of the invention in which its second main aspect is used in conjunction with a prism as light coupler arrangement for coupling in of the excitation light.

Figure 1:
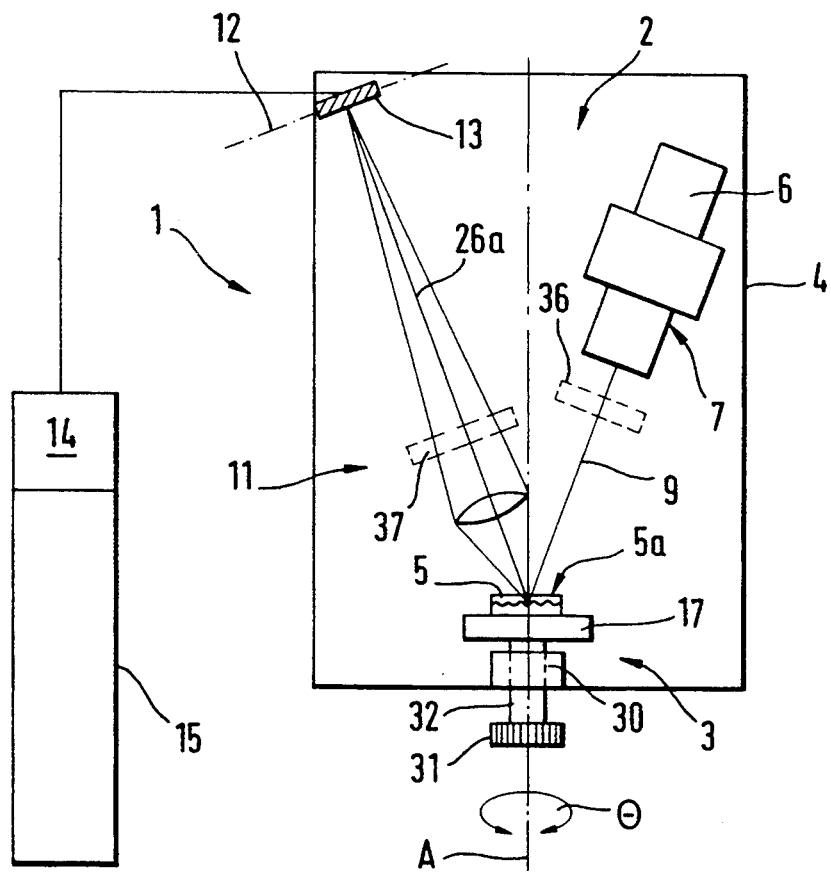
FIG. 1 shows a side elevation of a laboratory model of a device according to the invention.
Figure 3:
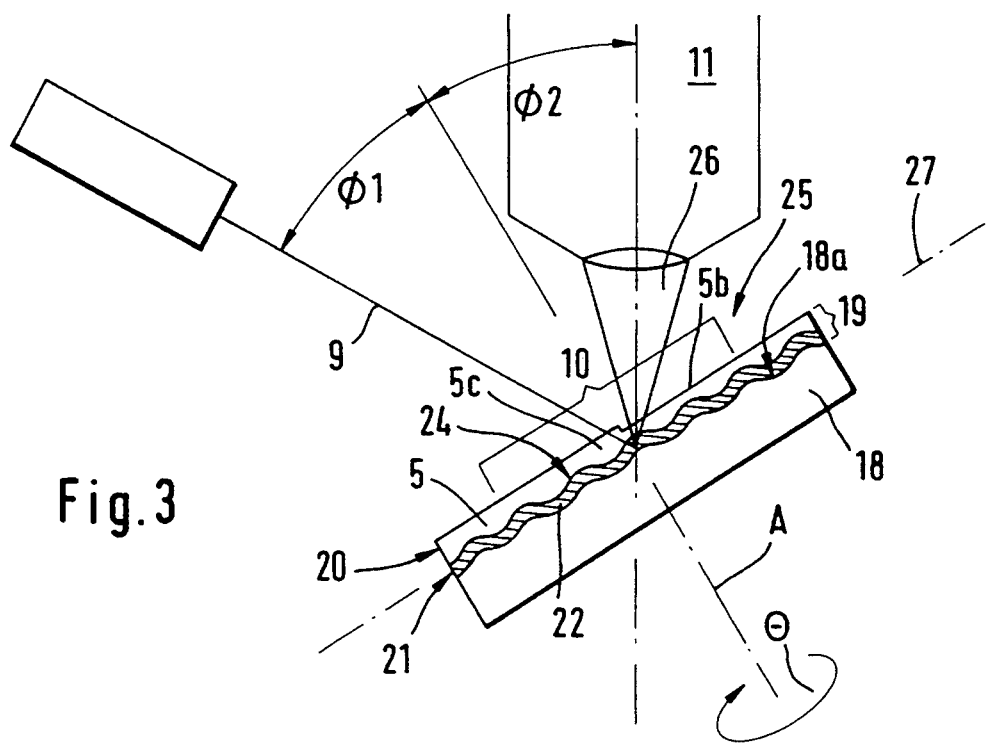
FIG. 3 shows a schematic representation of a first embodiment of the invention, in which surface plasmons are excited.
Figure 2:
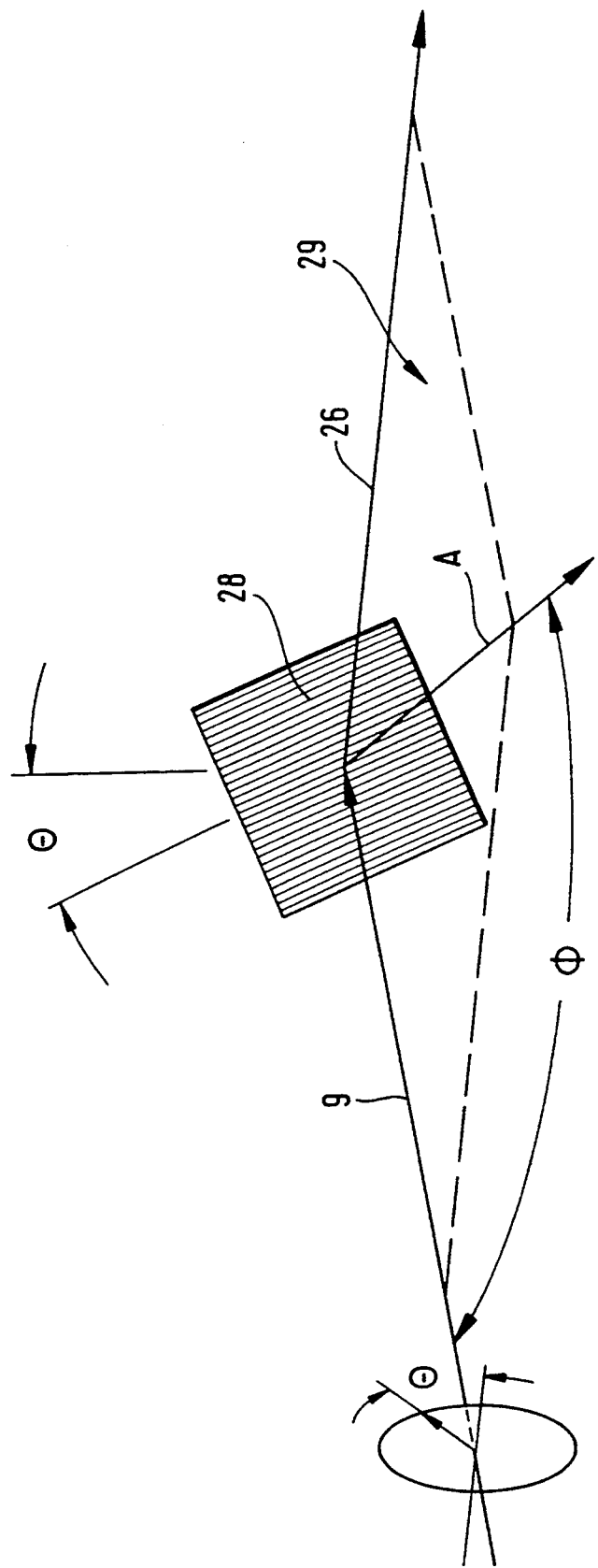
FIG. 2 shows a perspective diagrammatic representation of the geometric conditions.
Figure 4A:
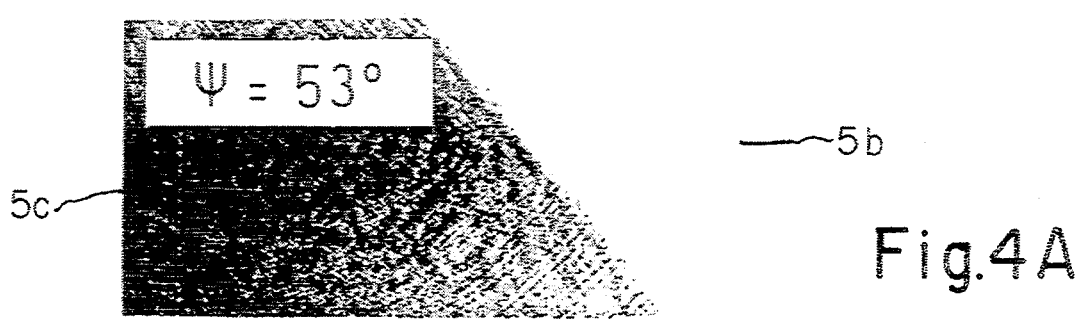
FIG. 4 shows photographic representations of images of an ultrathin object layer which were obtained using the embodiment according to FIG. 3.
Figure 4B:
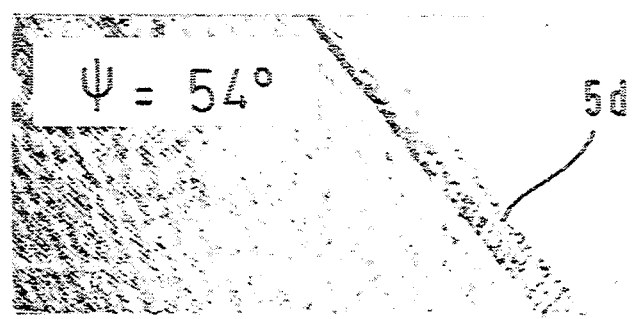
Figure 4C:
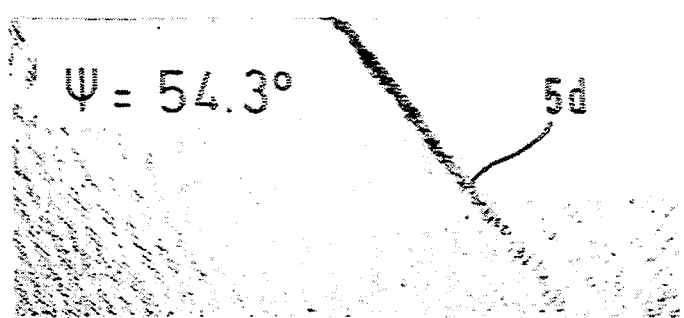
Figure 4D:
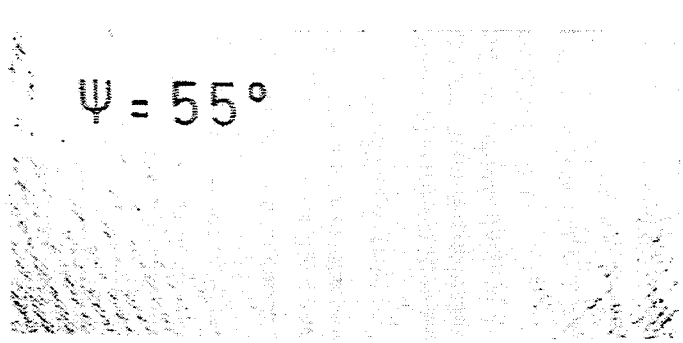
Figure 4E:
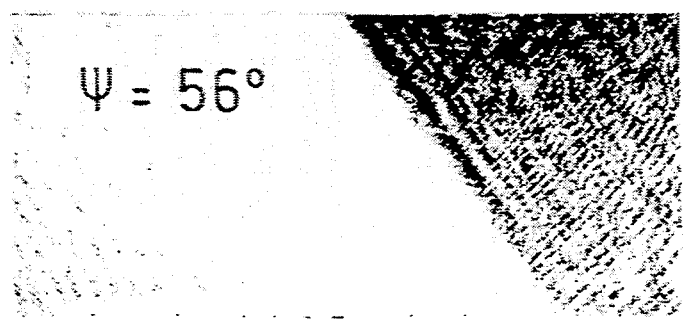

FIGS. 1 to 3 show a device 1 for the microscopy of ultrathin layers. The parts of the optical arrangement, which are designated as a whole by 2, and a specimen holder 3 are secured to a stable vertical plate 4. The optical arrangement 2 includes on the excitation side a laser 6 directed onto the surface 5a of an object layer 5 (FIG. 2). In a specific embodiment, a helium-neon laser 6 having a wavelength of 632.8 nm and a power of 5 mW was employed. Alternatively, a laser diode having a wavelength of 670 nm and a power of 4 mW was also successfully employed. The laser 6 is used as excitation light source 7 for the generation of a bound non-radiating electromagnetic wave in the object layer 5. The beam of the excitation light 9 which emerges from the excitation light source 7 is broadened by conventional (not shown) means to such an extent that it uniformly illuminates the investigation region 10 of the object layer 5.

The image side of the optical arrangement 2 essentially comprises an optical imaging system 11 and an array 13 of light-sensitive elements which is disposed in its image plane 12.

The optical imaging system is shown in the figure in simplified form as a lens. Preferably, a corrected microscope optical system is employed, as used in commercial reflected-light microscopes. A long distance microscope objective such as the "EPILAN LD" types of Zeiss is particularly preferred.

The array 13 of light-sensitive elements comprises for example CCDs, as used for TV cameras. It is connected to an image analysis device 14 which is a part of the electronic measuring system of the device, which system is designated as a whole by 15. A somewhat more detailed explanation of the image analysis and evaluation can be inferred from EP 0 469 377. Further details of this technique are known to a person skilled in the art and do not form the subject of the present invention.

On a specimen stage 17 of the specimen holder 3 there is secured a substrate 18 which serves as carrier for a layer structure 19 comprising at least two layers. The first layer 20 remote from the substrate 18 is the object layer 5. A metal layer 22 of silver is situated, as second layer 21 of the layer structure 19, between the object layer 5 and the substrate 18.

The surface 18a of the substrate 18 is provided with a grating structure 24, which is shown in the figures (as is the layer thickness of the layers) in a form which is greatly exaggerated and not to scale. In a practical embodiment, the surface 18a of the substrate 18 is made from a photoresist material in which a grating having a period length L=0.5 μm was generated holographically (H. Knobloch et al., J. Chem. Phys. 91 (1989) 3810). The metal layer 22 was formed by vacuum vaporization on the photoresist surface 18a of the substrate 18. The surface 18a of the substrate 18 is (apart from the grating structure 24, which has in relation to the surface dimension a very small amplitude of, for example, 15 nm) plane and flat.

Alternatively, the grating structure can also be generated by reactive plasma etching ("ion milling") or by means of an embossing technique in a thermoplastic polymer substrate, for example of PMMA ("Plexiglas"). The "injection molding" process is in particular suitable for mass production, which process is employed for the manufacture of CDs.

In the embodiment shown in FIG. 3, the grating structure 24 serves as light coupler arrangement 25 for coupling in the excitation light 9 and at the same time for coupling out the detection light 26; in this case, the angle of incidence $\phi 1$ is the same as the angle of coupling out $\phi 2$.

So far as described thus far, the device 1, according to the invention, for the microscopy of ultrathin layers is substantially in accord with known devices for surface plasmon microscopy. A significant difference resides in that the specimen stage 17, and thus the substrate 18 and the grating structure 24 situated thereon, is rotatable about an axis A extending perpendicular to the grating plane 27 of the grating structure 24. This allows to vary the orientation of the grating lines 28 relative to the plane of incidence 29 of the excitation light 9 by changing the azimuth angle $\Theta$ between the plane of incidence 29 and the grating lines 28. The plane of incidence 29 is, as usual, defined by the central ray of the excitation light 9 and the normal A to the object layer 5. In FIGS. 1 and 3, this is identical with the plane of the drawing. While in the previously known devices for the microscopy of ultrathin layers the angle of incidence $\phi 1$ (and at the same time the angle of emergence $\phi 2$) was varied, the adjustment of the optical contrast takes place, in the case of the invention, by the constructionally substantially simpler setting of the angle $\Theta$. In the case of the laboratory model shown in FIG. 1, the $\Theta$ setting is realized in a simple manner in that the specimen stage 17 is rotatable through arbitrary angles $\Theta$ on a shaft 32 which is settable in a rotary bearing 30 by means of a hand wheel 31.

As object layer 5 for the testing of the invention, monolayers of a polyglutamate polymer (poly[(gamma-methyl-L-glutamate)-co-(gamma-octadecyl-L-glutamate] were coated onto the silver layer by means of a Langmuir-Blodgett-Kuhn (LBK) Technique (W. Hickel et al.: Langmuir 6 (1990) 1403). Using this technique, partial regions 5b and 5c of the object layer 5 with differing layer thickness were produced, as is diagrammatically indicated in FIG. 3.

FIG. 4 shows experimental results for a case in which the thicknesses of the partial regions 5b and 5c differ by four monolayers. What is shown is a series of photographic exposures with the experimental arrangement which is described with reference to FIGS. 1 to 3. The exposures were made at a fixed angle $\phi = 35$ degrees and at the azimuth rotation angle $\Theta$ indicated in the figure. In this case, the angle $\Theta = 0$ degrees corresponds to a course of the grating lines 28 which is perpendicular to the plane of incidence 29. At $\Theta = 53$ degrees, the thicker partial region 5c (with the four monolayers) is in resonance and thus appears dark in reflection ($\phi 1 = \phi 2$). Upon rotation of the grating to 54 degrees, the partial region 5c is no longer in resonance, while a transition region 5d situated between 5b and 5c is in resonance and therefore dark. Further rotation to 54.3 degrees results in optimal resonance of the transition region 5d (with two additional monolayers) in comparison with the adjacent regions 5b and 5c. The difference between the transition region 5d and the adjacent regions 5b and 5c is in each instance approximately 3.5 nm, since a double layer of the polyglutamate polymer has approximately this thickness. Such a small layer difference can therefore be detected according to the invention with high contrast.

Upon further enlargement of the angle $\Theta$, the partial region 5b of the silver layer, on which partial region no additional polymer layers are situated, approaches resonance, which is achieved approximately at $\Theta = 56$ degrees (bottom photograph).

The invention makes use of an effect which may be explained in that the rotation through the azimuth angle $\Theta$ leads to a shift of the resonance angle $\phi$. This is an effect which has been known since a long time in the scientific literature. Reference is made to the following publications:

Y.-Y. Teng et al.: Phys. Rev. Lett. 19, 511 (1967)
T. Inagaki et al.: Phys. Rev. B28 1740 (1983)
G. B. Bryan-Brown et al.: Journal of Modern Optics, 37, 1227 (1990).

Within the context of the invention, it was established that the rotation of the grating allows adjustment of the contrast in the microscopy of ultrathin layers without disturbance of the image.

The excitation light 9 is frequently linearly polarized. Preferably, lasers 6 are used which generate polarized light. However, there may be provided a polarizer 36 in the beam of the excitation light 9, which polarizer is shown in FIG. 1 as an option, in broken lines. If (as previously common) the plane of incidence 29 extends perpendicular to the grating lines 28, plasmons in the metal layer 22 can be excited only by p-polarized light (i.e. with a direction of polarization in the plane of incidence).

Upon rotation of the grating structure 24 through an azimuth angle $\Theta$ not equal to zero, plasmons can also be excited by s-polarized light. In order to achieve an excitation intensity independent of the azimuth angle $\Theta$, it can in this case be expedient to rotate the plane of polarization of the excitation light 9 synchronously with the setting of the azimuth angle $\Theta$ of the grating lines 28, as is indicated in FIG. 2.

According to a further preferred embodiment, a polarizer 37, likewise shown in FIG. 1 as an option in broken lines, is disposed in the light path 26a of the detection light 26. It can serve on the one hand to eliminate undesired reflected components (for example s-polarized components in the case of the use of unpolarized excitation light). Secondly, it permits an investigation, which is differentiated with respect to the angle of polarization, of object layers which show an anisotrophy with respect to their polarization behavior. Within the context of the invention, a plasmon microscopic detection of such anisotrophies is possible if azimuth angles Θ not equal to zero are used. Finally, it is in this case also possible to detect selectively the s-polarized components of the detection light and thus to achieve a contrast reversal.

Figure 5:
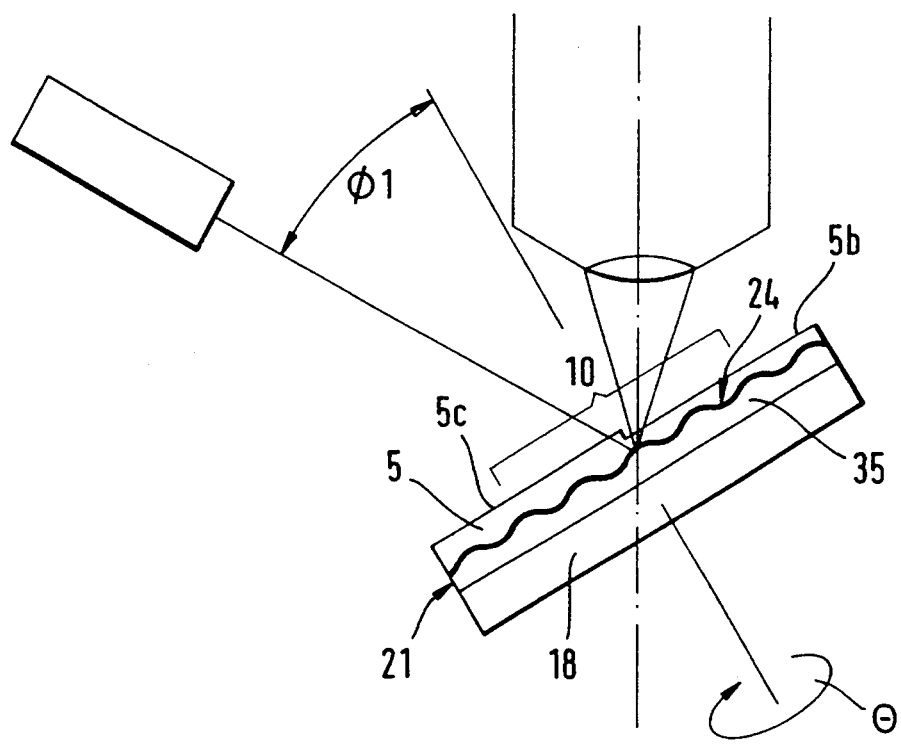
FIG. 5 shows a schematic representation of a second embodiment of the invention, in which waveguide modes are excited.

The embodiment shown in FIG. 5 differs from FIG. 2 in that in place of the metal layer a waveguide layer 35 extends as second layer 21 on the substrate 18. This layer consists of an optically transparent material, the refractive index of which is higher than that of the adjacent layers 5 and 18, so that total reflection occurs at the boundary surfaces if the angle of incidence is smaller than the critical angle. If the excitation light 9 impinges at an excitation angle $\phi 1$ on the grating structure 24, which in this case also serves for coupling in, an optical waveguide mode is excited in the waveguide layer 35. As mentioned, this technique and its application for analytical purposes is in principle known, so that it does not need to be explained in greater detail here.

When optical waveguide modes were hitherto employed in the field of analytics this was only in spatially integrating measurement methods without lateral resolution, such as, for example, in the abovementioned European Patent Specification 0 226 604. The embodiment of FIG. 5 differs from these known methods not only with respect to the Θ rotation but also fundamentally in that a laterally resolved investigation (i.e. a microscopy) is possible. To this end, it is essential that the light is not only coupled in, but also coupled out, in the investigation region 10. As a result of the energy loss associated therewith, the optical path length of the optical waveguide mode in the layer 35 is substantially shortened. Typically, it amounts (defined by the attenuation of the amplitude by a factor 1/e) to less than 10 μm, in comparison with a few cm in spatially integrating methods. In contrast thereto, in the previously conventional integrating methods it was considered important that the optical waveguide mode extends over a relatively large path length, on which the object layer to be investigated is in contact with the waveguide layer. The substantially shorter optical path length of the optical waveguide modes in the instant invention cause a reduction of the interaction with the object layer 5, i.e. potentially a reduction of the sensitivity. Surprisingly, within the context of the invention it has become evident that nevertheless a quantitatively evaluatable detection of the lateral differences of the layer thickness of the object layer 5 within the investigation region 10 is possible, which detection permits an analytical evaluation.

Figure 6:
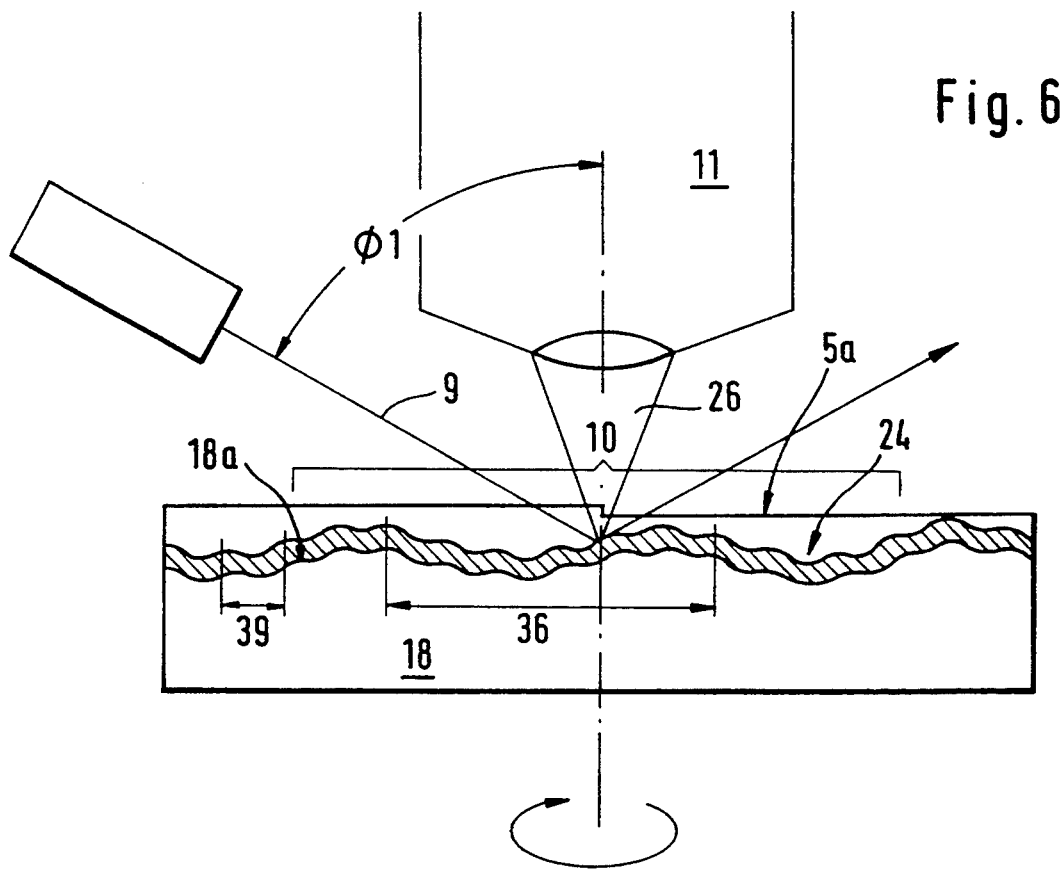
FIG. 6 shows a schematic representation of a third embodiment of the invention with a multidiffractive grating structure.

FIG. 6 shows an embodiment in which the grating structure 24 is designed in multidiffractive fashion. In the case shown, the surface 18a of the substrate 18 is provided with a double grating structure, which is formed from the superposition of a first grating 36 with a grating constant L1 and of a second grating 39 with a larger grating constant L2. One of the gratings (e.g. 36) serves for the coupling in of the excitation light and the second grating 39 for the coupling out of the detection light. In this case, it is of particular advantage that, according to the second main aspect of the invention, the magnitude of the grating vector of the coupling out grating 39 is approximately identical to the magnitude of the wave vector of the bound non-radiating electromagnetic wave, so that the detection light is coupled out approximately perpendicular to the grating plane and consequently can be detected with a microscope optical system arranged in the same position as a standard light microscope vertically above the surface 5a of the object layer 5. This is explained hereinbelow with reference to FIGS. 7 to 10.

FIG. 8 shows a graphical representation of the coupling in and coupling out condition for a double grating structure, as shown in FIG. 7. In this case, two gratings with differing grating constants L1 and L2 extend at differing angles $\phi 1$ and $\phi 2$ to the plane of incidence 29. The difference Θ2 minus Θ1 is also shown.

Resonant excitation of a surface plasmon takes place when the conditions of conservation of energy and of conservation of momentum are satisfied. From this follows the condition $$K_x(\text{Ph}) = K(\text{Sp}) \pm m \cdot G. \quad (1)$$

In this expression, $K_x(\text{Ph})$ is the component of the photon momentum in the plane of the metal layer $$K_x(\text{Ph}) = |K(\text{Ph})| \sin \phi \quad (2)$$

K(Sp) is the momentum of the surface plasmon and G is the reciprocal grating vector $$G = 2/L \quad (3)$$

FIG. 8 is a graphical representation of the coupling in and coupling out conditions.

For the excitation of a surface plasmon with the magnitude $|K(\text{Sp})|$ by a coupling in grating with the azimuth angle Θ1 and the reciprocal grating vector $|G1|$, the result is that the projection of a photon satisfying the coupling in condition must have the magnitude and the direction of the arrow designated in FIG. 8 by $K_x(\text{Ph})^{in}$.

The corresponding result for a coupling out grating with the angle Θ2 and the reciprocal grating vector G2 is the x-component of the photon momentum which is designated in FIG. 8 by $K_x(\text{Ph})^{out}$.

In FIG. 9 it is graphically shown that $K_x(\text{Ph})^{out}$ becomes zero when the following condition is applicable:

$$|G2| = |K(\text{Sp})| \quad (4)$$

i.e. when the magnitude of the grating vector G2 is identical to the magnitude of the wave vector K(Sp) of the bound non-radiating electromagnetic wave. It results from this that the detection light is coupled out perpendicularly from the surface 5a of the object layer 5.

It has to be noted that the grating lines of the coupling in grating and the coupling out grating may also be parallel. This can in fact be preferable because of easier manufacturing of such double grating with parallel lines.

At a given frequency of the excitation light, the wave vector of the surface plasmon K(Sp) is dependent upon the dispersion relation of the surface plasmons. Since, as has been explained hereinabove, this relation is in turn influenced by the thickness and the material of the object layer 5, the plasmon momentum is (slightly) dependent upon the properties of the object layer 5 (this is, as explained above, the effect on which plasmon microscopy is based). Consequently, the condition (4) cannot be precisely observed for all conditions of the object layer. This is, however, not necessary, since it is sufficient if the condition (4) is "substantially" observed in the sense that the detection light 26 falls into the numerical aperture of an optical imaging system (microscope) 11 which is disposed thereabove and the optical axis of which extends perpendicular to the surface of the object layer 5. This numerical aperture can be particularly large as a result of this favourable orientation of the microscope optical system.

FIG. 10 shows an embodiment of the invention in which the coupling out grating 40 again satisfies the condition (4), so that the detection light emerges substantially perpendicularly into the optical imaging system 11. The coupling in takes place in this case, however, with the aid of a prism 41. The grating 40 is impressed onto the base 42 of prism 41 and a very thin metal layer 43 is applied as second layer 21. It was established that the optical transmittance of a metal layer having a thickness of less than 50 nm is high enough to allow excitation of surface plasmons through the metal layer at the opposite boundary surface to the object layer 5.

Since the coupling in condition in the case of a prism is independent of its azimuth angle orientation, in the case of the embodiment according to FIG. 10 exclusively the second main aspect of the invention is applied.

In FIG. 10, the binding partners of a specific binding reaction are also symbolically shown, namely a first binding partner 45 bonded to the metal layer 43 and a second binding partner 47 freely mobile in a specimen liquid 46.

In this embodiment, the object layer 5 is situated in a flow cell, the walls of which are formed by the base 42 of the prism 41 and a cover glass 44 disposed thereabove. The sequence of the analysis is in this case such that first the specimen is brought into contact for an adequate length of time with the object layer 5, in which the bonded binding partner 45 is situated. As a result of the binding reaction, the thickness and/or composition of the object layer 5 is changed. Because of the laterally heterogeneous binding properties the thickness change resulting from the binding of the free binding partner 47 to the bound binding partner 45 (cf. EP-A-0 469 377) is also laterally heterogeneous.

After completion of the binding reaction, the flow cell 49 is rinsed, in order to remove an excess of free binding partner 42 and to assure the required optical transparency.

Of course, numerous variants of the invention based on the foregoing description are possible. In particular, the layer structure 19 can comprise more than the described two layers; in this case, any possible further layers should preferably be situated between the second layer 21 and the substrate 18, while the object layer 5 is preferably in direct contact with the second layer 21.

The grating structure is preferably provided in the surface 18a of the substrate 18, to which surface the second layer 21 is (directly or indirectly) applied. It is, however, in principle also possible that a grating structure for coupling in or coupling out is provided in the second layer 21 or at the surface thereof remote from the substrate 18. Numerous different examples of possible multidiffractive grating structures are described in EP-A-0 455 067.

I claim:

1. A device for the laterally resolved investigation of a laterally heterogeneous ultrathin object layer, especially for the laterally resolved detection of a change in the layer thickness of the object layer which results from a specific binding reaction of a first binding partner bound to the object layer with a free second binding partner, having
   a multilayer structure which extends in an investigation region on a plane surface of a substrate parallel to the plane surface and which comprises the object layer as first layer and a second layer adjacent to the object layer,
   light coupler means for coupling in excitation light, incident in a plane of incidence, into the second layer, in which the excitation light generates at at least one defined angle of incidence a bound non-radiating electromagnetic wave in the second layer, from which an evanescent wave extends into the object layer and
   an optical imaging system for the imaging of the investigation region of the object layer in an image plane said optical imaging system being arranged at a defined angle of emergence, at which detection light is coupled out from the second layer,
wherein
   the coupler arrangement comprises an optical grating structure which extends in the investigation region parallel to the object layer and
   the optical grating structure is rotatable about an axis extending perpendicular to the grating plane, to vary the orientation of the grating lines relative to the plane of incidence by changing the azimuth angle between the plane of incidence and the grating lines to thereby adjust the image contrast.

2. Device according to claim 1, wherein the second layer is a metal layer and the bound electromagnetic wave is a surface plasmon.

3. Device according to claim 1, wherein the second layer is a waveguide layer and the bound electromagnetic wave is a waveguide mode guided in the waveguide layer.

4. Device according to claim 1, wherein a two-dimensional array of light-sensitive elements is disposed in the image plane, which array is coupled to an image analysis device.

5. Device according to claim 1, wherein the excitation light is polarized and the plane of polarization of the excitation light is rotatable synchronously with the variation of the azimuth angle of the grating lines.

6. Device according to claim 1, wherein a polarizer is disposed in the light path between the object layer and the image plane.

7. A device for the laterally resolved investigation of a laterally heterogeneous ultrathin object layer, especially for the laterally resolved detection of a change in the layer thickness of the object layer which results from a specific binding reaction of a first binding partner bound to the object layer with a free second binding partner, having
   a multilayer structure which extends in an investigation region on a plane surface of a substrate parallel to the plane surface and which comprises the object layer as first layer and a second layer adjacent to the object layer,
   light coupler means for coupling in excitation light, incident in a plane of incidence, into the second layer, in which the excitation light generates at at least one defined angle of incidence a bound non-radiating electromagnetic wave in the second layer, from which an evanescent wave extends into the object layer and
   an optical imaging system for the imaging of the investigation region of the object layer in an image plane said optical imaging system being arranged at a defined angle of emergence, at which detection light is coupled out from the second layer, wherein a coupling out grating is provided for coupling out of the detection light, which grating extends in the investigation region parallel to the object layer, and the magnitude of the grating vector of the coupling out grating is substantially the same as the magnitude of the wave vector of the bound non-radiating electromagnetic wave, whereby the detection light is coupled out substantially perpendicular to the grating plane.

8. Device according to claim 7, wherein the coupling out grating is part of a multidiffractive grating structure, in which a first grating period serves to couple in the excitation light and a second grating period serves to couple out the detection light at differing angles.

9. Device according to claim 8, wherein the multidiffractive grating structure is a double grating structure.

10. Device according to claim 7, wherein the light coupler means for coupling in the excitation light includes a prism and the coupling out grating extends parallel to the base of the prism.

* * * * *